United States Patent

Kim et al.

[11] Patent Number: 5,889,595
[45] Date of Patent: Mar. 30, 1999

[54] METHOD OF STOPPING A PRINTING OPERATION UPON RECEPTION OF ABNORMAL IMAGE DATA IN A FACSIMILE

[75] Inventors: Jae-Ho Kim, Gumi-city; Gang-Bock Lee, Goomi-city, both of Rep. of Korea

[73] Assignee: SamSung Electronics Co., Ltd., Suwon, Rep. of Korea

[21] Appl. No.: 662,326

[22] Filed: Jun. 12, 1996

[30] Foreign Application Priority Data

May 17, 1995 [KR] Rep. of Korea ............................ 12272
Jun. 12, 1995 [KR] Rep. of Korea ............................ 15382

[51] Int. Cl.⁶ ............................... H04N 1/00; H04N 1/32; B41J 29/38; G06F 15/00
[52] U.S. Cl. .......................... 358/437; 358/468; 358/405; 358/296; 347/5; 347/14; 395/113; 395/114
[58] Field of Search ..................... 358/434, 437, 358/468, 296, 405, 444, 404, 401, 440; 395/113, 114; 347/5, 9, 14, 19, 133

[56] References Cited

U.S. PATENT DOCUMENTS

| | | | |
|---|---|---|---|
| 4,785,328 | 11/1988 | Tanimoto et al. | 355/14 R |
| 5,206,735 | 4/1993 | Gauronski et al. | |
| 5,253,079 | 10/1993 | Nakatani et al. | 358/426 |
| 5,293,530 | 3/1994 | Yoshida et al. | 400/223 |
| 5,333,062 | 7/1994 | Hara et al. | |
| 5,467,203 | 11/1995 | Kawata | 358/405 |
| 5,493,421 | 2/1996 | Uetama et al. | |

*Primary Examiner*—Edward L. Coles
*Assistant Examiner*—Mark Wallerson
*Attorney, Agent, or Firm*—Robert E. Bushnell, Esq.

[57] ABSTRACT

A method of stopping a printing operation in a facsimile system includes detecting a ring signal, receiving image data to be printed in the printing operation after detecting the ring signal, and stopping the printing operation and displaying an error message when the image data is determined to contain a predetermined number of consecutive black data lines. The predetermined number of consecutive black data lines represent a length on a recording sheet that is greater than or equal to a selected millimeters.

20 Claims, 5 Drawing Sheets

METHOD OF STOPPING A PRINTING OPERATION UPON RECEPTION OF ABNORMAL IMAGE DATA IN A FACSIMILE

CROSS-REFERENCE TO RELATED APPLICATIONS

This application makes reference to, incorporates the same herein, and claims all benefits accruing under 35 U.S.C. §119 arising from an application for *Method Of Stopping A Printing Operation Upon Reception Of Abnormal Image Data In A Facsimile* earlier filed in the Korean Industrial Property Office on the 12th of June 1995 and there duly assigned Ser. No. 15382/1995, and makes reference to, incorporates the same herein, and claims all benefits accruing under 35 U.S.C. §120 arising from an application for *Apparatus And method For Stopping Print Operation Upon Reception And Copy Of Sequential Block Data In facsimile System* earlier filed in the U.S. Patent & Trademark Office on the 15th of May 1996 and there duly assigned Ser. No. 08/648,386, which, in turn made reference to, incorporated the same therein, and claimed all benefits accruing under 35 U.S.C. §119 from an application entitled *Method Of Stopping Print Operation Upon Reception And Copy Of Sequential Black Data In Facsimile System* earlier filed in the Korean Industrial Property Office on the 17th day of May 1995, and there duly assigned Ser. No. 12272/1995 by that Office.

BACKGROUND OF THE INVENTION

The present invention relates to a process and device for stopping a printing operation upon reception of abnormal image data in a facsimile telecommunications system, and more particularly, to a process and device for stopping a printing operation upon reception of a predetermined number of consecutive black data lines.

Generally, a facsimile telecommunications system receives image data by executing a system protocol after a ring signal has been detected, or by scanning a document upon input of a copy key. Protocol sets rules for the interaction of transmission and reception of units of telecommunications equipment, that are usually implemented through the programming of the data terminal equipment involved rather than being built into the hardware. In a plain paper facsimile system dedicated to printing image data onto cut sheets of a printable medium such as paper, a developing unit including an expendable organic photosensitive OPC drum, and a toner hopper supplying toner are designed to be exchanged when depleted to a point of use in excess of a predetermined limit of usage. After the image data is received, an operation for printing the image data is executed. With a plain paper facsimile, a consumable developing unit is often utilized. This developing unit typically includes an organic photoconductive (OPC) drum and a toner hopper for storing toner. After the developing unit is used to generate a given number of printed sheets, it should be exchanged for a new one so that proper printing operations can be continued.

When by mistake a user erroneously transmits a document with an upside down orientation from a facsimile telecommunications unit, and the back surface of the document exhibits a color of a given degree of darkness, the receiving facsimile will interpret and print the received image data as a continuous stream of black image data (i.e., all lines are composed of black dots). Accordingly, the receiving facsimile expends a large quantity of toner in order to print the black image data. We have found that since the developing unit should be exchanged after a given amount of use, these types of situations are particularly troublesome in terms of unnecessarily useless toner depletion. Moreover, when an expended developing unit is continually used in a facsimile system employing a thermal print head (TPH), a problem arises in that the thermal print head (TPH) becomes overheated, thereby causing damage to the facsimile system.

Another problem that occurs in facsimile telecommunications systems from transmission of telecommunications data attributible to an upside down sheet of paper is the unnecessary consumption of sheets of paper. One recent effort that attempts to addresses the issue of paper conservation is U.S. Pat. No. 5,493,421 entitled *Facsimile Apparatus* issued to Uetama et al. In Uetama et al. '421, when blank line data representative of a predetermined number of blank lines (i.e., the entire line is composed of white dots) is received successively, then printing control means produces an output omitting the blank line data. As a result, the blank line data, which may represent margins or the like, is omitted in printing. While this type of conventional art is useful for conserving recording sheets in a facsimile telecommunications system, we note that it fails to address the problem of unnecessary toner consumption.

SUMMARY OF THE INVENTION

Accordingly, it is an object of the present invention to provide an improved facsimile telecommunications system and operational process for operating the facsimile telecommunications system.

It is another object to provide a process for operating a facsimile telecommunications system that conserves both toner and recording sheets.

It is still another object to provide a process for stopping a printing operation upon reception of abnormal image data in a facsimile telecommunications system.

It is yet another object to provide a process of stopping a printing operation upon reception of a predetermined number of consecutive black data lines in a facsimile telecommunications system.

It is still yet another object to provide a process and facsimile telecommunications apparatus for interrupting an operation for sequentially printing upon a record medium upon continuous either reception or copy reproduction of image data predominantly indicative of a single color over an excessive length of the record medium.

It is a further object to provide a process and circuit for controlling a facsimile telecommunications unit by detecting and terminating the printing of image data that is substantially devoid of information.

It is also an object to provide a process and a circuit for minimizing consumption of toner by an image formation device while printing image data that is substantially or completely devoid of information.

To achieve these and other objects, the present invention provides a facsimile telecommunications system and an operational process for stopping a printing operation in a facsimile system. The system detects a ring signal, or a copy key, receives image data to be printed in the printing operation after detecting the ring signal, and stops the printing operation and displays an error message when the image data is determined to contain a predetermined number of consecutive black data lines. The predetermined number of consecutive black data lines represent a length on a recording sheet that is greater than or equal to a selected value. In one embodiment, the selected value was set to equal approximately fifty millimeters.

BRIEF DESCRIPTION OF THE DRAWINGS

A more complete appreciation of the invention, and many of the attendant advantages thereof, will be readily apparent as the same becomes better understood by reference to the following detail description when considered in conjunction with the accompanying drawings in which like reference symbols indicate the same or similar components, wherein.

DETAILED DESCRIPTION OF THE PREFERRED EMBODIMENT

Figure 1:
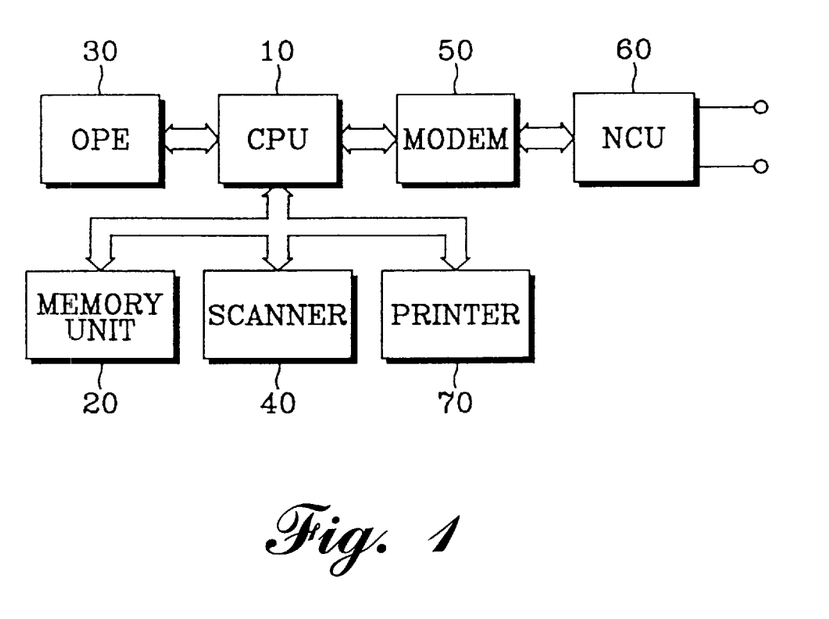
FIG. 1 is a block diagram illustrating the structure of a facsimile system constructed in accordance with the principles of the present invention.

Turning now to the drawings and referring to FIG. 1, the structure of the facsimile system in accordance with the present invention is shown. As may be seen from FIG. 1, the facsimile and copying system comprise a central processing unit CPU 10, a memory unit 20, an operation panel OPE 30, a scanner 40, a modem 50, a network control unit NCU 60, and a printer 70. Central processing unit 10 controls the facsimile and copying system according to a given program, and accordingly, when black data over the predetermined number of lines is sequentially provided upon reception of; or copy of, image data, the facsimile and copying system stops a print operation under control of central processing unit 10. Memory 20 stores a program for stopping the print operation, when image data of a document is printed as protocol data or black data over a sequential predetermined number of lines, and data is accessed or stored in memory 20 under control of central processing unit 10. Operational panel 30 includes a plurality of keys for generating various key data, such as a dial key, copy key and function setting key, or other keys for generating key data, and a visual display for exhibiting varying visual displays of data. Scanner 40 scans an image of the document, converts the scanned image data into digital image data, and then provides the digital image data to central processing unit 10. Modem 50 is controlled by central processing unit 10, modulates output data of central processing unit 10 into analog data, and demodulates received analog data into digital data. Network control unit 60 operates according to the control of central processing unit 10 to thereby form a speech loop of a telephone line, and interfaces signals of modem 50 and signals of the telephone line. Printer 70 prints received data according to the control signal of central processing unit 10.

Figure 2:
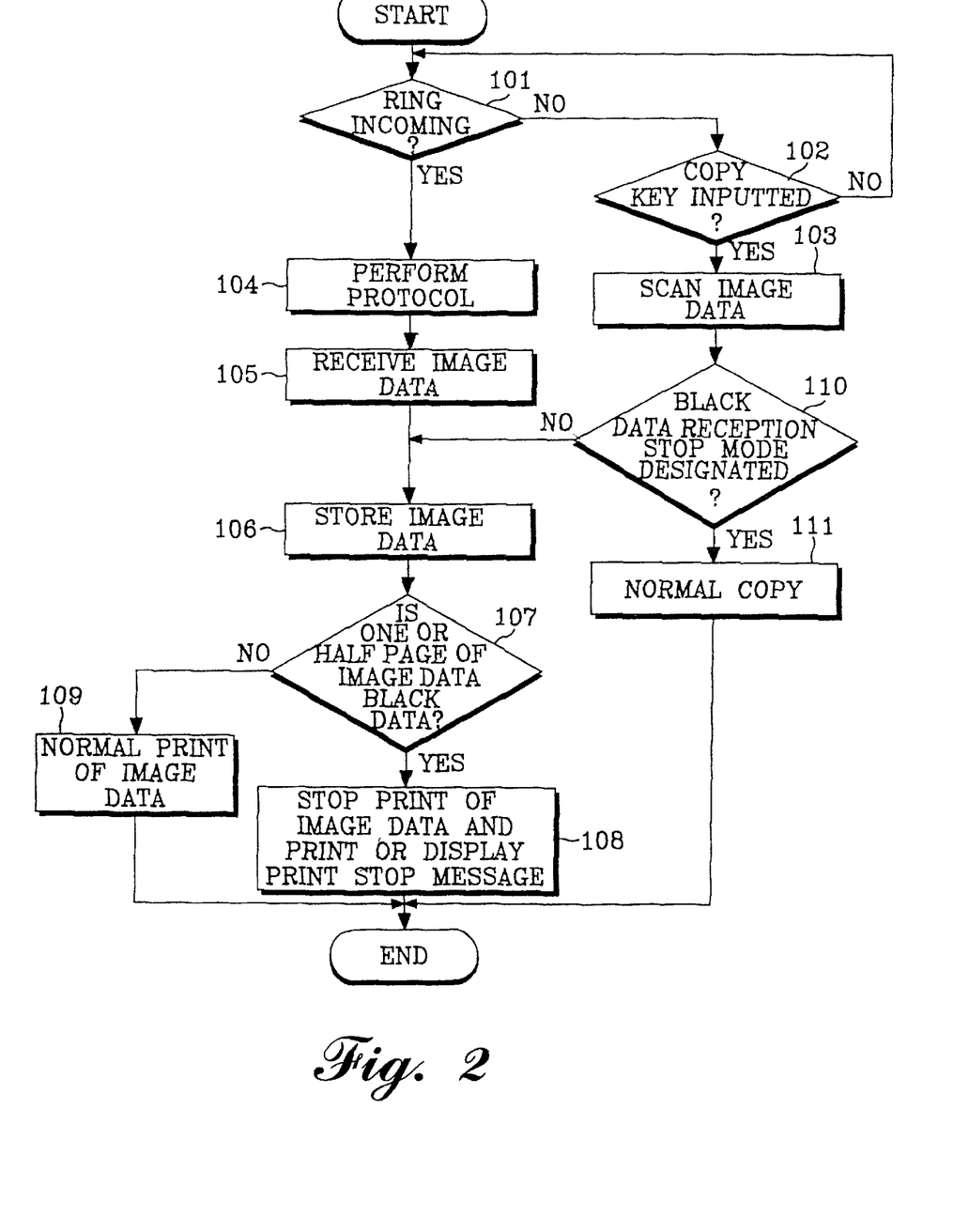
FIG. 2 is a flow chart illustrating control operations for stopping a print operation upon reception of black data in accordance with one embodiment of the present invention.

FIG. 2 is a flow chart illustrating control operations for stopping a print operation upon reception of black data in accordance with a first embodiment of the present invention. As shown in FIG. 2, the control process uses protocols to receive facsimile transmitted image data in response to a received ring signal, or scanning image data of a document in response to activation of copy key, storing received image data or scanned image data in the memory, and when image data read out from the memory is black data over a sequential predetermined number of lines, stopping the print operation and displaying a print stop message.

Figure 3:
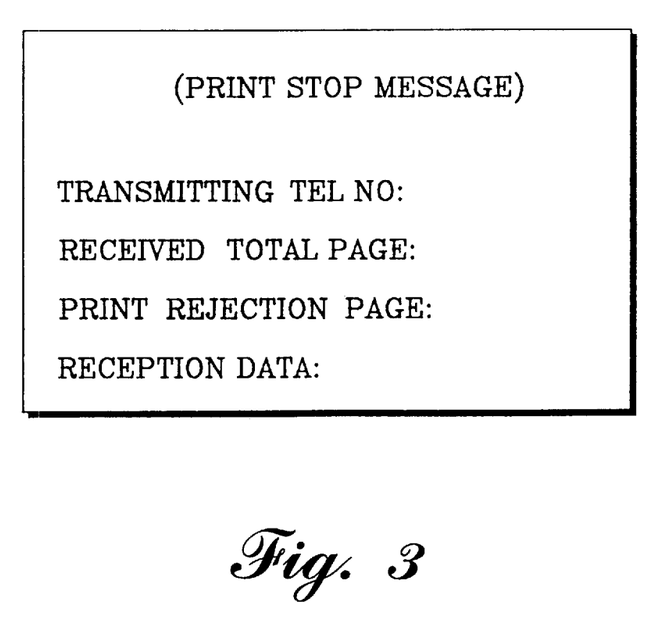
FIG. 3 is a view showing output state of a print stop message in accordance with the principles of the present invention.

FIG. 3 shows an output state of the print stop message in accordance with the present invention. With reference to FIGS. 1 through 3 collectively, one embodiment of the present invention will be explained, in detail, in the following paragraphs.

First, central processing unit 10 determines whether a ring signal has been detected in a ring detection unit (not shown) of network control unit 60 in step 101 and when no ring signal is detected, proceeds to step 102. In step 102, central processing 10 detects whether a copy key (not shown) of a key input unit (not shown) on operation panel 30 is activated. When the copy key is not activated step 101 is repeated. When the copy key is activated, central processing unit 10 drives scanner 40 and the image on the document to be copied is scanned in step 103, and simultaneously, central processing unit 10 detects, step 110, whether a black data reception stop mode has been designated by an input from a black data reception stop mode key (not shown) from the key input unit of operation panel 30. When central processing unit 10 determines that the black data reception stop mode has not been designated, the normal copy operation, step 111, is performed. When central processing unit 10 determines in step 110 that the black data reception stop mode has been designated, the scanned image data is stored, step 106, in memory unit 20.

When central processing unit 10 determines a ring signal has been detected in the ring detection unit of network control unit 60 in step 101, central processing unit 10 performs predetermined protocol operations in step 104. After the protocol operations have been performed, facsimile transmitted image data is received, step 105, and stored, step 106, in memory unit 20.

Following step 106 of storing received or copied image data in memory unit 20, central processing unit 10 detects whether a sequential predetermined number of lines, i.e., a whole page or half a page of stored image data, is black data, step 107. Here, black data is intended to be detected by page unit (e.g., one page or one-halfof a page), but it can be detected by line unit (e.g. three lines, five lines, or more). When central processing unit 10 determines in step 107 that the number of lines of black data stored in memory unit 20 is not more than the predetermined number of lines, the image data is read from memory unit 20 and provided to printer 70 to be printed, step 109, in a normal printing operation. On the other hand, when central processing unit 10 determines in step 107 that the number of lines of black data stored in memory unit 20 is more than the predetermined number of lines, central processing unit 10 proceeds to step 108. In step 108, central processing unit 10 controls printer 70 not to print image data, and prints or displays the print stop message, as shown in FIG. 3, through printer 70 or a display unit of operation panel 30.

Figure 4:
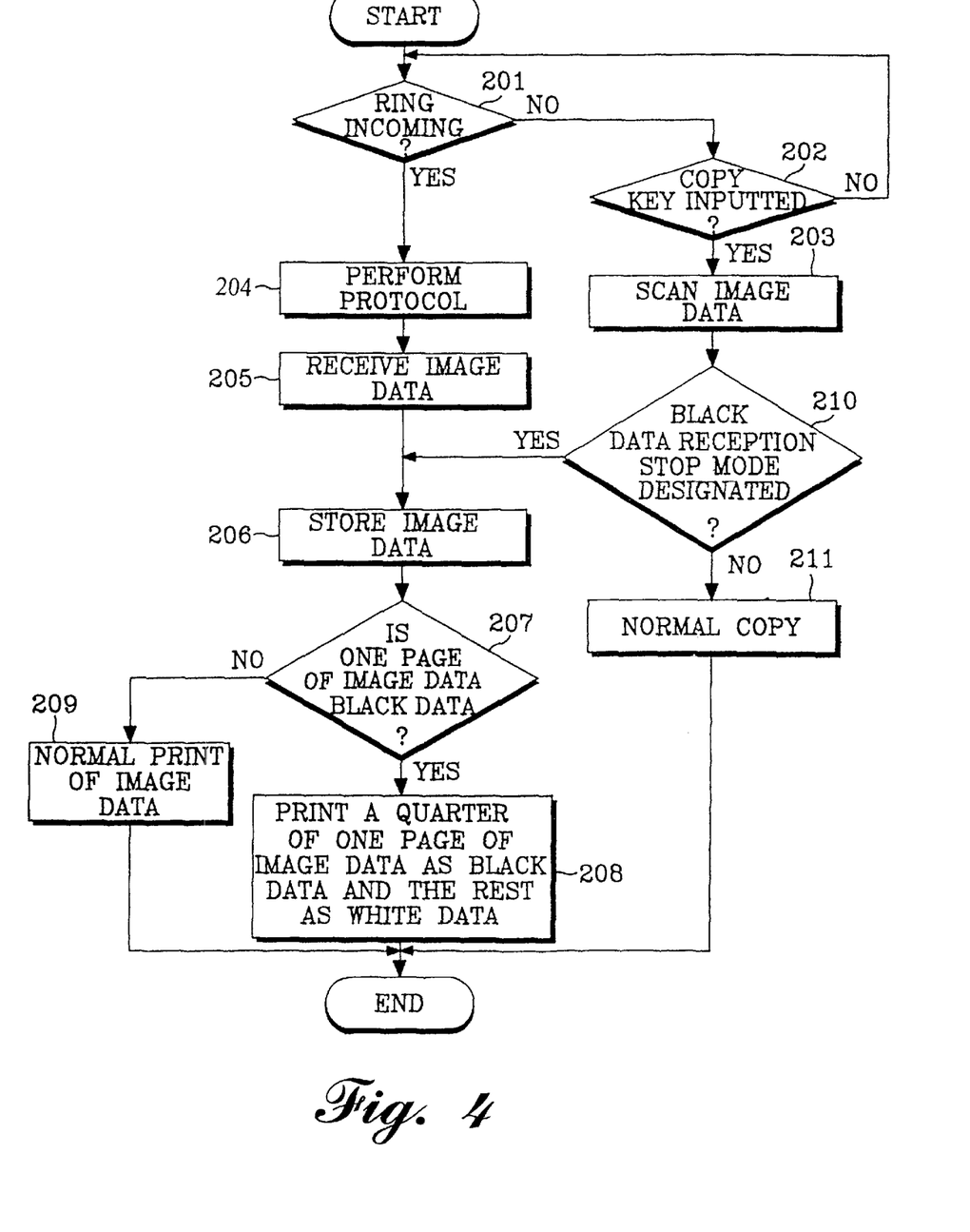
FIG. 4 is a flow chart illustrating control operations for stopping print operation upon reception of black data in accordance with another embodiment of the present invention.

FIG. 4 shows the flow chart illustrating a control operations for stopping the print operation upon reception of black data in accordance with a second embodiment of the present invention. As may be seen from FIG. 4, the control process comprises the steps of performing protocols to receive facsimile transmitted image data in response to a received ring signal, or scanning image data of a document in response to activation of copy key, storing received image data or scanned image data in the memory, and when image data read out from the memory is black data over a sequential predetermined number of lines, printing a given number of lines of image data in one page of image data as black data and the rest as white data.

With reference to FIGS. 1, 3 and 4 collectively, one preferred embodiment of the present invention will be explained, in detail, in the following paragraphs.

First, central processing unit 10 determines whether a ring signal has been detected in a ring detection unit (not shown) of network control unit 60 in step 201 and when no ring signal is detected, proceeds to step 202. In step 202, central processing 10 detects whether a copy key (not shown) of a key input unit (not shown) on operation panel 30 is activated. When the copy key is not activated step 201 is repeated. When the copy key is activated, central processing unit 10 drives scanner 40 and the image on the document to be copied is scanned in step 203, and simultaneously, central processing unit 10 detects in step 210 whether a black data reception stop mode has been designated by an input from a black data reception stop mode key (not shown) from the key input unit of operation panel 30. When central processing unit 10 determines that the black data reception stop mode has not been designated, the normal copy operation, step 211, is performed. When central processing unit 10 determines that the black data reception stop mode has been designated in step 210, the scanned image data is stored, step 206, in memory unit 20.

When central processing unit 10 determines a ring signal has been detected in the ring detection unit of network control unit 60 in step 201, central processing unit 10 performs predetermined protocol operations in step 204. After the protocol operations have been performed, facsimile transmitted image data is received, step 205, and stored, step 206, in memory unit 20.

Following step 206 of storing received or copied image data in memory unit 20, central processing unit 10 detects, step 207, whether a sequential predetermined number of lines, i.e., a whole page or half a page of stored image data, is black data. Here, black data is intended to be detected by page unit (e.g., one page), but it can be detected by line unit (e.g., 3 lines, 5 lines, or more). When central processing unit 10 determines that the number of lines of black data stored in memory unit 20 is not more than the predetermined number of lines, the image data is read from memory unit 20 and provided to printer 70 to be printed, step 209, in a normal printing operation. On the other hand, when central processing unit 10 determines in step 207 that the number of lines of black data stored in memory unit 20 is more than the predetermined number of lines, central processing unit 10 proceeds to step 208. In step 208, central processing unit 10 controls printer 70 to print image data corresponding to a quarter of one page of stored image data as black data and the rest as white data.

Figure 5A:
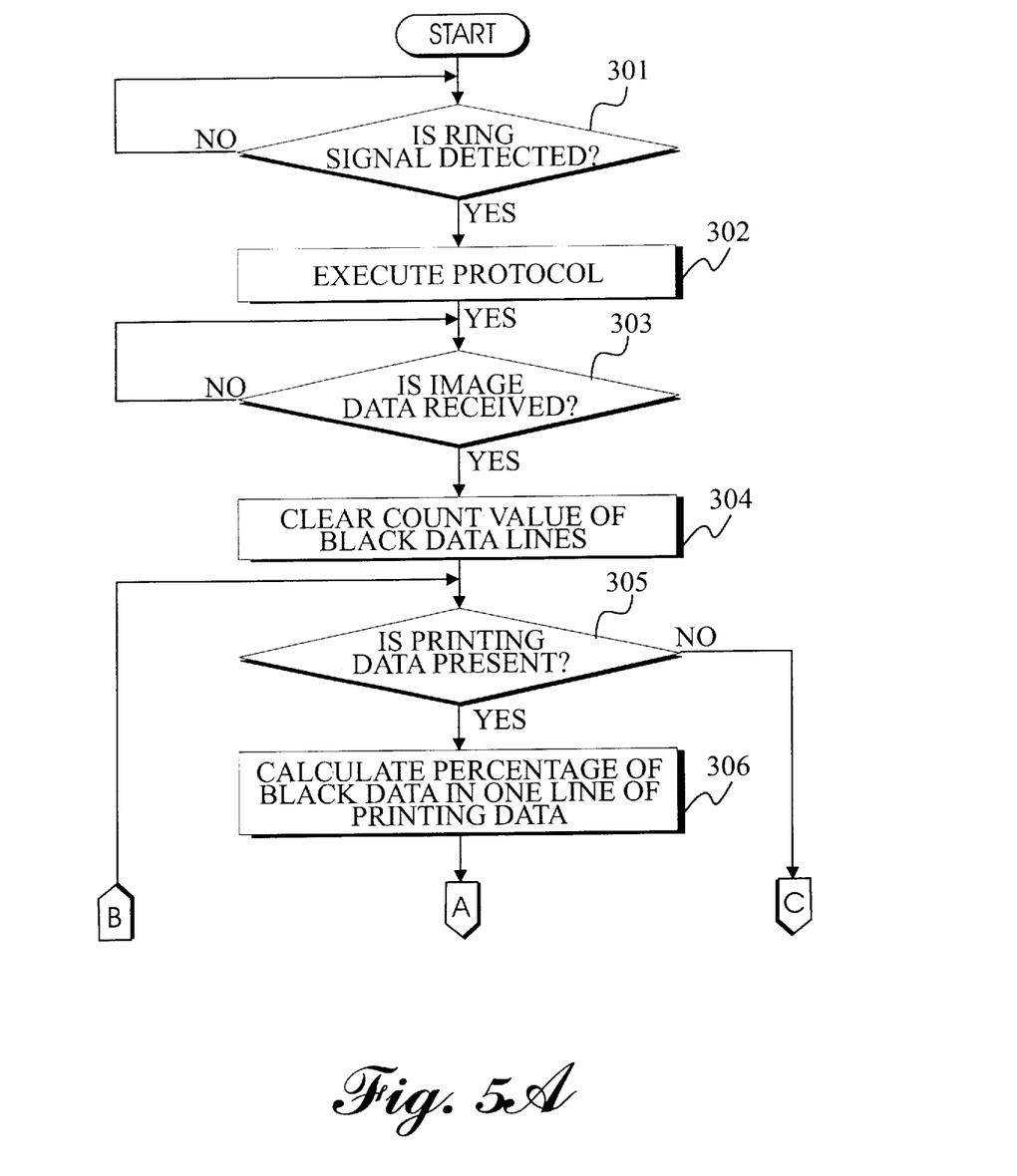
FIGS. 5A and 5B are flow charts illustrating control operation for stopping a printing operation upon reception of black data in accordance with still another embodiment of the present invention.
Figure 5B:
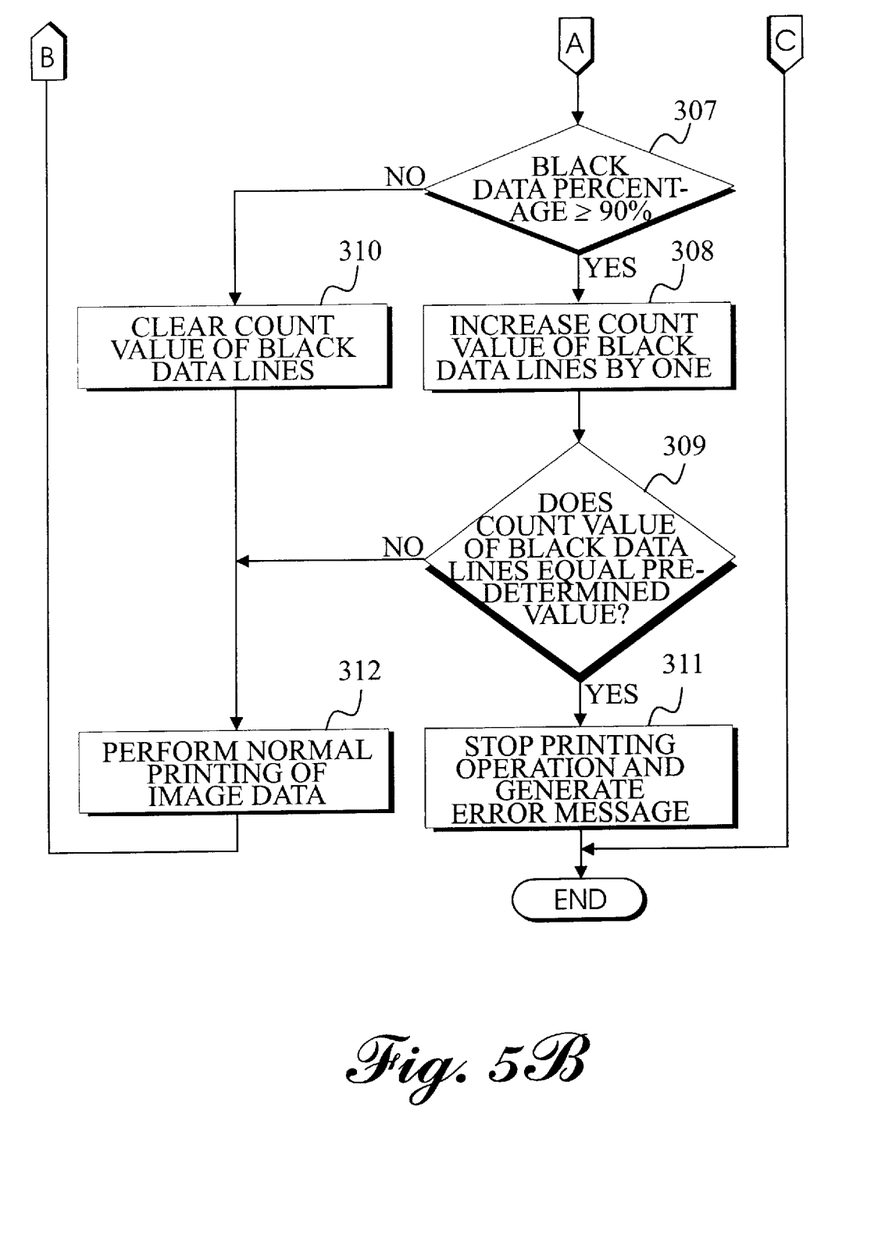

FIGS. 5A and 5B are flow charts illustrating control operations for stopping the printing operation upon reception of a continuous quantity of black data in accordance with a third embodiment of the present invention. Briefly, this embodiment contemplates receiving image data by executing a system protocol after a ring signal is detected, or alternatively, receiving image data by scanning images from a document after input of a copy key, and stopping printing of the image data when the image data received is determined to include a predetermined number of consecutive black data lines, preferably when the data lines exhibit more than a set degree of blackness (e.g., ninety percent or more black). Here, the predetermined number of consecutive black data lines represent a length on a recording sheet that is greater than or equal to a selected value, such as, by way of example, a value somewhat greater than the length of a typical single sheet of cut paper, but less than the length of two consecutive cut sheets of such paper, such as about fifty millimeters.

A detailed description of the operation of the third embodiment of the present invention will now be provided with reference to FIGS. 1, 5A and 5B.

In step 301, central processing unit (CPU) 10 determines whether a ring signal is detected by a ring detector of network control unit (NCU) 60. When the ring signal is detected, central processing unit (CPU) 10 proceeds to step 302 and executes a predetermined system protocol. Then, in step 303, central processing unit (CPU) 10 determines whether image data is received. When image data is received, central processing unit (CPU) 10 proceeds to step 304 and clears a count value representative of a detected number of black data lines. In step 305, central processing unit (CPU) 10 determines whether printing data is present. When printing data is present, central processing unit (CPU) 10 proceeds to step 306 and calculates a percentage of black data (i.e., data representing a single color of toner) within a given line of the printing data. Black data is simply data that is to be represented on a recording sheet by the application of toner, or other developing material. This percentage is obtained by the following expression:

[(number of dots of black data in the line)÷(total number of dots in one line)]×100%.

In step 307, central processing unit (CPU) 10 determines whether the percentage of black data for the given line is greater than or equal to 90%. When the percentage of black data for that line of printing data is not greater than or equal to 90%, central processing unit (CPU) 10 proceeds to step 310 and clears the count value of black data lines. Alternatively, when the percentage of black data for that line of printing data is greater than or equal to 90%, then that line of printing data is considered to be a black data line, and central processing unit (CPU) 10 proceeds to step 308 and increases the count value of black data lines by one. Then, in step 309, central processing unit (CPU) 10 determines whether the count value of black data lines equals a predetermined value. In the present invention, this predetermined value is set equal to the number of lines corresponding to a given printing distance along the length of a recording sheet. In a preferred embodiment of the present invention, this length is 50 millimeters or more. That is, the predetermined value is set equal to the number of lines of printing data that occupy a distance greater than or equal to 50 millimeters along the length of a recording sheet. When the count value of black data lines does not equal the predetermined value in step 309, then central processing unit (CPUT) 10 enables normal printing of one line of the image data in step 312, and then proceeds back to step 305. Alternatively, when the count value of black data lines equals the predetermined value, then central processing unit (CPU) 10 stops the printing operation and generates an error message on the display unit of operating panel (OPE) 30.

In the facsimile system, and method therefor, as described above, when received image data contains more than a sequential predetermined number of lines of black data during a copy operation or facsimile reception operation, a print operation of image data is ended and a print stop message is printed or displayed. Therefore, there is an advantage of preventing unnecessary waste of toner or paper due to undesired printing of a whole page of data as a result of operational error or error of the facsimile system.

Furthermore, when received image data contains more than the predetermined number of lines of black data, image data corresponding to a given number of lines, e.g. a quarter of a page, is printed as black data and the rest of the page of image data is printed as white data. Therefore, there is an advantage in that the lifetime of the expendable element, i.e., photosensitive drum or developing unit, is extended by preventing toner waste and accordingly, the cost of the maintenance or repairing can be reduced in the plain paper facsimile system.

It is understood that various other modifications will be apparent to and can be readily made by those skilled in the art without departing from the scope and spirit of this invention. For example, since it is known to store an image in memory in order to perform a delayed facsimile transmission, then the present invention can be used to prevent a facsimile transmission when a predetermined number of sequential lines of image data stored in memory are determined to be black data. While the foregoing embodiments of the invention have been described in terms of the printing of black data, the principles of the invention apply to image data representative of any single color of toner. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. A method of stopping a printing operation in a facsimile system, comprising the steps of:

detecting a ring signal;

receiving image data to be printed in said printing operation after detecting said ring signal; and stopping said printing operation and displaying an error message when said image data is determined to contain a predetermined number of consecutive black data lines representing a length on a recording sheet that is greater than or equal to 50 millimeters.

2. A method of stopping a printing operation in a facsimile system, comprising the steps of:

detecting a ring signal;

receiving image data to be printed in said printing operation after detecting said ring signal;

calculating percentages of black data within respective lines of said image data;

classifying selected ones of said respective lines as black data lines in dependence upon said percentages;

stopping said printing operation when said image data is determined to contain a predetermined number of consecutive black data lines; and providing display of an error message after said step of stopping said printing operation.

3. The method as claimed in claim 2, wherein said selected ones of said respected lines are classified as black data lines when said percentages exceed 85%.

4. The method as claimed in claim 2, wherein said predetermined number of consecutive black data lines represent a length on a recording sheet that is greater than or equal to 50 millimeters.

5. The method as claimed in claim 3, wherein said predetermined number of consecutive black data lines represent a length on a recording sheet that is greater than or equal to 50 millimeters.

6. A method of stopping a printing operation in a facsimile system, comprising the steps of:

detecting a ring signal;

receiving image data to be printed in said printing operation after detecting said ring signal;

clearing a count value representative of a number of consecutive black data lines within said image data;

calculating a percentage of black data within a given line of said image data;

determining whether said percentage is greater than or equal to a predetermined percentage;

clearing said count value, printing said given line of said image data and then returning to said calculating step when said percentage is not greater than or equal to said predetermined percentage;

increasing said count value by one, and then determining whether said count value equals a predetermined value when said percentage is greater than or equal to said predetermined percentage;

printing said given line of said image data and then returning to said calculating step when said count value does not equal said predetermined value;

stopping said printing operation when said count value equals said predetermined value; and providing display of an error message after said step of stopping said printing operation.

7. The method as claimed in claim 6, wherein said predetermined percentage equals 90 percent.

8. The method as claimed in claim 6, wherein said predetermined value represents a number of lines of printed data that occupy a distance greater than or equal to 50 millimeters along a length of a recording sheet.

9. The method as claimed in claim 6, wherein said printing of said image data causes said image data to be recorded onto a plurality of cut sheets of recordable media.

10. The method as claimed in claim 7, wherein said display of said error message conveys to a user first data corresponding to a telephone number at a source of said image data, second data corresponding to a total number of pages of said image data received, third data corresponding to rejected pages, and fourth data corresponding to said image data.

11. The method as claimed in claim 8, wherein said display of said error message conveys to a user first data corresponding to a telephone number at a source of said image data, second data corresponding to a total number of pages of said image data received, third data corresponding to rejected pages, and fourth data corresponding to said image data.

12. A facsimile telecommunications system, comprising:

first means, connectable to a telephone line, for detecting occurrence of a ring signal on the telephone line;

second means for performing a printing operation by printing upon sequentially positioned recording media images representative of image data received via the telephone line;

third means for detecting receipt of said image data to be printed during said printing operation after said ring signal is detected by said first means, and for stopping said printing operation performed by said second means when said image data is determined to contain a predetermined number of data lines representing a single color within a length of the recording medium that is not less than a selected value;

said data lines being consecutive in sequence along said length during said printing operation; and fourth means for providing visual display of an error message after said printing operation is stopped.

13. The facsimile telecommunications system of claim 12, wherein said display of said error message conveys to a user first data corresponding to a telephone number at a source of said image data, second data corresponding to a total number of pages of said image data received, third data corresponding to rejected pages, and fourth data corresponding to said image data.

14. The facsimile telecommunications system of claim 12, further comprising wherein said length of the recording medium that is not less than a selected value corresponds to half of said recording medium.

15. The facsimile telecommunications system of claim 12, comprised of said second means performing said printing of said images upon a plurality of sequentially positioned cut sheets of the record media.

16. The facsimile telecommunications system of claim 12, comprised of said third means:

determining what percentage of said image data designating a single color to be printed within each line during said printing operation exceeds a set value, and stopping said printing operation performed by said second means when said image data is determined to contain a predetermined number of consecutive data lines of said single color each having not less than said set value over said length on the recording medium.

17. The facsimile telecommunications system of claim 12, comprised of said third means:

determining what percentage of said image data designating a single color to be printed within each line during said printing operation exceeds a set value, and stopping said printing operation performed by said second means when said image data is determined to contain a predetermined number of data lines of said single color each having not less than said set value over said length on the recording medium.

18. The facsimile telecommunications system of claim 13, comprised of said third means:

determining what percentage of said image data designating a single color to be printed within each line during said printing operation exceeds a set value, and stopping said printing operation performed by said second means when said image data is determined to contain a predetermined number of data lines of said single color each having not less than said set value over said length on the recording medium.

19. The facsimile telecommunications system of claim 15, comprised of said third means:

determining what percentage of said image data designating a single color to be printed within each line during said printing operation exceeds a set value, and stopping said printing operation performed by said second means when said image data is determined to contain a predetermined number of consecutive data lines of said single color each having not less than said set value over said length on the recording medium.

20. The facsimile telecommunications system of claim 15, comprised of said third means:

determining what percentage of said image data designating a single color to be printed within each line during said printing operation exceeds a set value, and stopping said printing operation performed by said second means when said image data is determined to contain a predetermined number of data lines of said single color each having not less than said set value over said length on the recording medium.

* * * * *